Jan. 5, 1926.
C. F. COWDREY
1,568,804
BRAKE TESTING DEVICE FOR AUTOMOBILES
Filed March 16, 1925
4 Sheets-Sheet 1
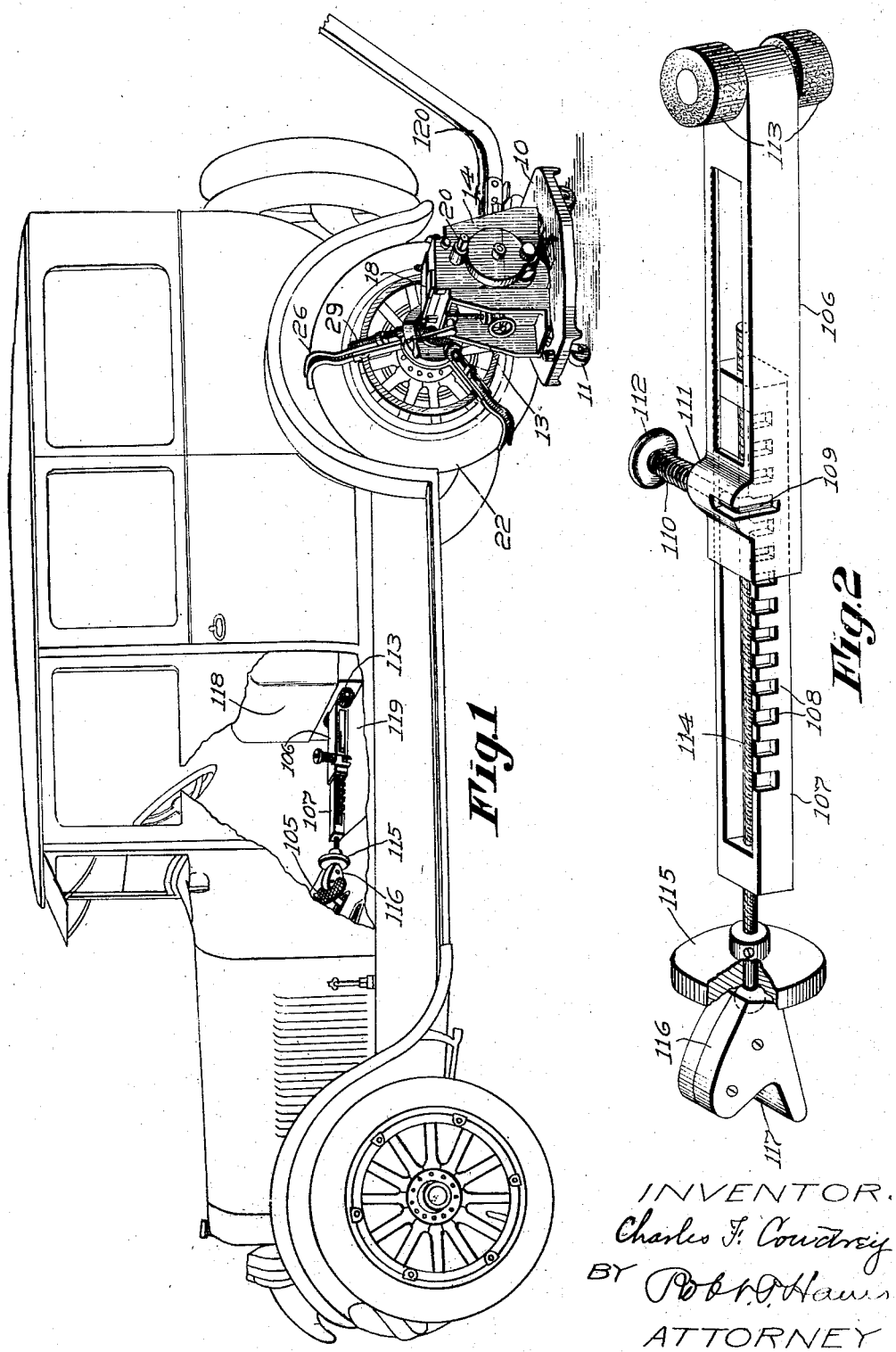
INVENTOR:
Charles F. Cowdrey
BY Rob't D. Haws
ATTORNEY Jan. 5, 1926. 1,568,804
C. F. COWDREY
BRAKE TESTING DEVICE FOR AUTOMOBILES
Filed March 16, 1925 4 Sheets-Sheet 2

INVENTOR
Charles F. Cowdrey
BY Robt. F. Harris
ATTORNEY

Jan. 5, 1926.  
C. F. COWDREY  
1,568,804  
BRAKE TESTING DEVICE FOR AUTOMOBILES  
Filed March 16, 1925  
4 Sheets-Sheet 3
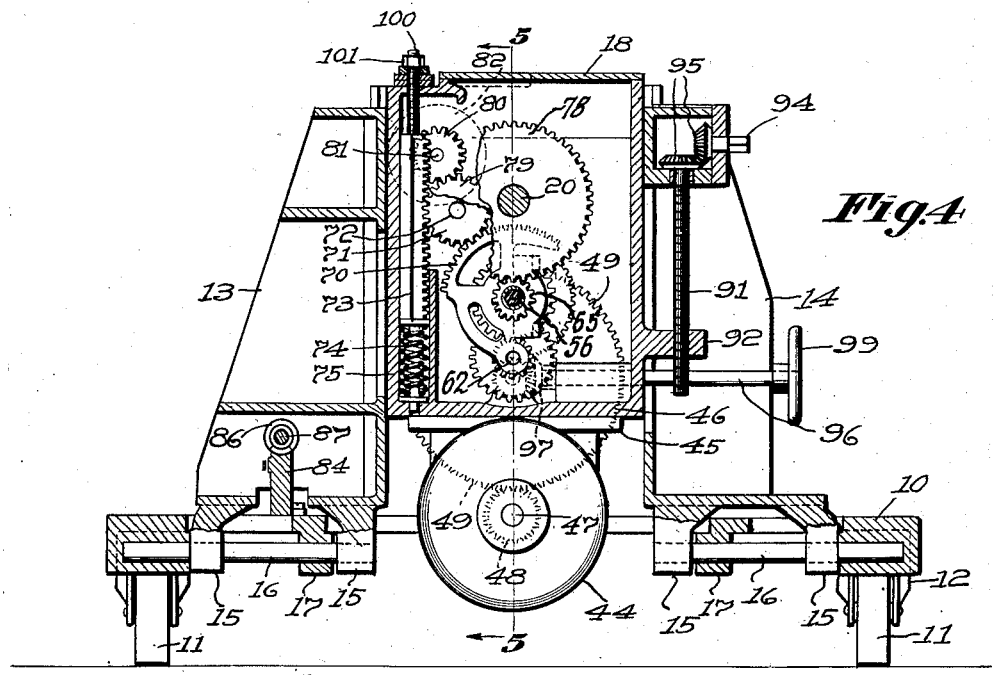
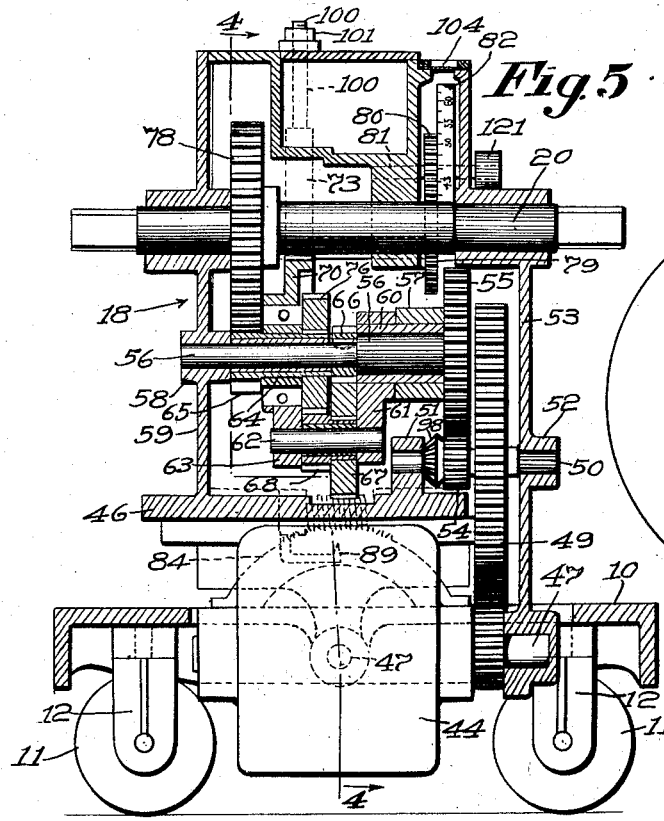
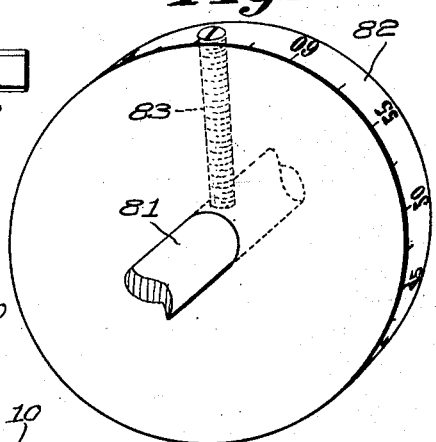
INVENTOR  
Charles F. Cowdrey  
BY Robt O. Harris  
ATTORNEY Jan. 5, 1926. 1,568,804
C. F. COWDREY
BRAKE TESTING DEVICE FOR AUTOMOBILES
Filed March 16, 1925    4 Sheets-Sheet 4
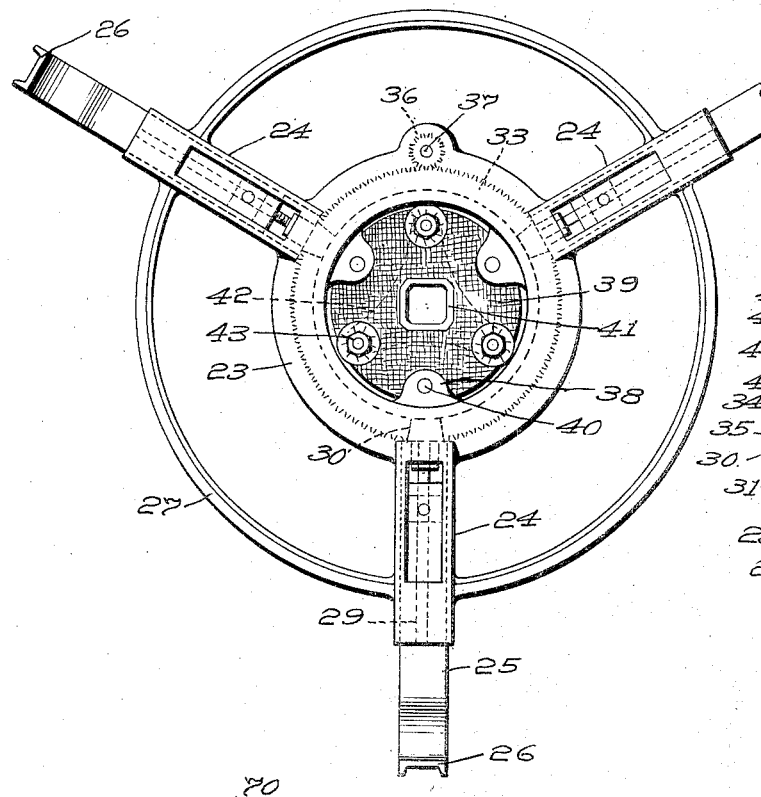
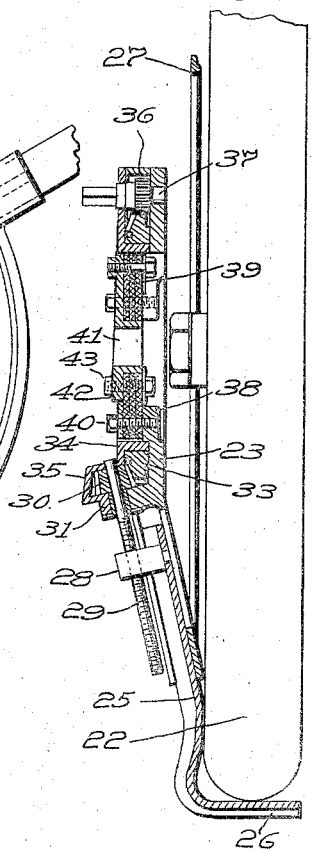
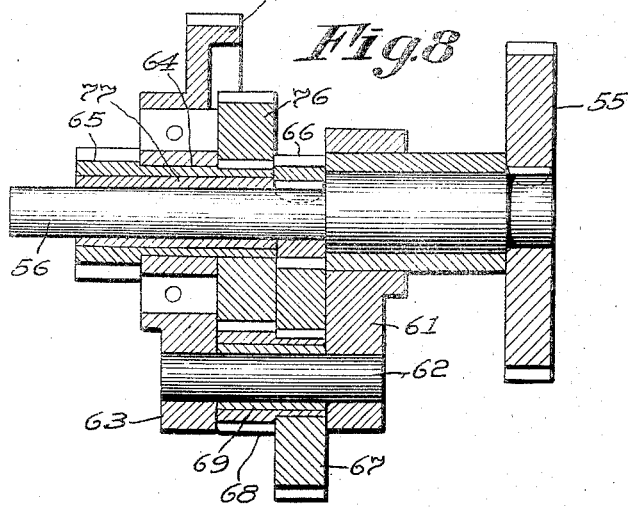
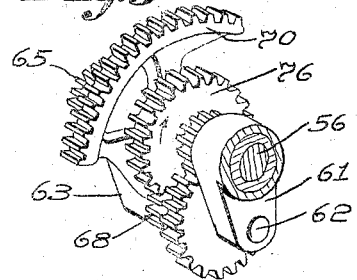
INVENTOR
Charles F. Cowdrey
BY Robt T. Harris
ATTORNEY Patented Jan. 5, 1926.

1,568,804

UNITED STATES PATENT OFFICE.

CHARLES F. COWDREY, OF FITCHBURG, MASSACHUSETTS.

BRAKE-TESTING DEVICE FOR AUTOMOBILES.

Application filed March 16, 1925. Serial No. 15,867.

REISSUED

*To all whom it may concern:*

Be it known that I, CHARLES F. COWDREY, a citizen of the United States, residing at Fitchburg, county of Worcester, and State of Massachusetts, have invented an Improvement in Brake-Testing Devices for Automobiles, of which the following description, in connection with the accompanying drawings, is a specification, like characters on the drawings representing like parts.

This invention relates to a device for testing the action of the brakes upon the wheels of an automobile or other vehicle.

During the early development of automobiles, every effort was made to increase the speed at which they could be driven, and as a result practically all automobiles now in use are capable of traveling at a dangerously high rate of speed. Now that most automobiles are capable of being driven at a higher rate of speed than it is safe to operate them, a question of prime importance is, how quickly may the automobile be stopped in an emergency.

The promptness with which the speed of an automobile may be checked depends upon the action of the brakes, and it is extremely important that the brakes of an automobile be kept properly adjusted so that they will quickly check the speed of an automobile without causing the automobile to swerve from a direct line of travel.

If the brake bands act with greater force on a wheel at one side of an automobile than at the other side, the automobile will tend to swerve from a direct line of travel when the brake is applied, due to one side of the automobile being retarded with a greater force than the other. Furthermore, unless each brake band acts upon its wheel with a force that increases rapidly as the pressure upon the brake is applied, the speed of the automobile cannot be checked quickly.

Many of the automobile accidents now frequently occurring are due to faulty or improperly adjusted brakes which either fail to check the speed of the automobile promptly, or cause the automobile to swerve from its direct path of travel. The improper adjustment of the brakes is due, to a large degree, to the lack of practical means for testing the action of the brakes upon the wheels of an automobile to determine their braking effect.

Heretofore it has been proposed to employ a lever or other operating means to turn an automobile wheel thru a small angle while the brake is applied, and to indicate the turning force exerted upon the wheel. This proposed construction served to indicate the force required to impart initial rotative movement to a wheel to turn it from a standing position; but does not indicate the true action of a brake upon the wheel under actual running conditions. In other words, the true action of a brake upon a continuously rotating wheel cannot be determined by merely determining the force required to turn a wheel from a standing position thru a small angle.

Having the foregoing in mind, the primary feature of the present invention resides in mechanism for rotating a wheel continuously thru a complete revolution or successive revolutions under brake resistance and for indicating the turning force applied to the wheel.

A more specific feature of the invention resides in adjustable means for holding the foot brake pedal depressed to apply the brake, and in mechanism for rotating the opposite wheels of the automobile while the pedal remains in the same depressed position and for indicating the turning force applied to each wheel, to determine the action of each brake band upon its wheel, and whether the brake bands on the opposite wheels are exerting approximately the same retarding force.

Several different types of automobile wheels are now in use; some wheels are provided with wooden spokes, others with wire spokes, and still others have no spokes but are of the disk type. In testing the action of the brakes of an automobile, the means for rotating the automobile wheel should be so constructed that it may be readily applied to any of these different types of wheels. Furthermore, the hub of some wheels project outwardly much further than others, and the wheel rotating means should be constructed to clear the differently shaped hubs.

Another feature of the invention, therefore, resides in a wheel engaging head having outwardly extending arms adapted to grip the tire of an automobile wheel to secure the head in place upon the wheel and in alinement with its axis; and having the arms constructed to be adjusted outwardly at an angle to the plane of the wheel so that they will accommodate different sized wheels, and so that the head will be moved outwardly away from the wheel hub as the arms are adjusted outwardly. As a result of this construction by which the arms are adjusted along an inclined path, the head is automatically moved outwardly away from the face of the wheel to clear the protruding hub of a large wheel, and is moved inwardly toward the hub of a small wheel.

Another feature of the invention resides in a universal connection between the head and the driving shaft so that the shaft need not be accurately alined with the head to rotate it smoothly.

As is well known, the front wheels of an automobile do not rotate in a vertical plane, but converge inwardly as they extend downwardly to cause the wheels to steer better. As a result the axles of the front wheels are inclined slightly to the horizontal. When the brakes upon the front wheels of an automobile are to be tested, it is desirable that the wheel rotating shaft of the present device be inclined slightly to the horizontal to conform to the inclination of the front axles of the automobile wheel. Another feature of the present invention, therefore, resides in means for supporting this rotating shaft so that it may be readily inclined in one direction or the other to the horizontal.

Another feature of the invention resides in a brake testing device having a wheel rotating shaft, each end of which is adapted to be placed in operative engagement with an automobile wheel. This is desirable because it permits the shaft to be rotated in the same direction in testing wheels upon either side of an automobile, since, in testing the brake upon a wheel at the right hand side of an automobile, one end of this shaft is placed in driving engagement with the wheel, and in testing the brake upon a wheel at the left-hand side of an automobile, the other end of the shaft is placed in driving engagement with the wheel.

Still another feature of the invention resides in yielding means controlled by the driving force exerted upon an automobile wheel and which serves to operate an indicator that indicates the force required to turn the wheel under brake resistance.

Other features of the invention and novel combination or parts in addition to the above will be hereinafter described in connection with the accompanying drawings which illustrate one good practical form thereof.

In the drawings:

Fig. 1 is a perspective view of an automobile showing the brake testing device of the present invention in its operative position adjacent a wheel of the automobile, and showing the foot pedal held depressed by an adjustable pedal depressor.

Fig. 2 is an enlarged perspective view of the pedal depressor.

Fig. 4 is a vertical sectional view thru the truck and mechanism supported thereby, the section being taken on line 4—4 of Fig. 5.

Fig. 5 is a vertical sectional view taken on the line 5—5 of Fig. 4.

Fig. 6 is an inner face view of the wheel engaging head.

Fig. 7 is a vertical sectional view thru the head of Fig. 6, showing the same in engagement with an automobile wheel.

Fig. 8 is an enlarged vertical sectional view thru a number of gears shown in Fig. 5.

Fig. 9 is a perspective view of the gear supporting mechanism by which one pair of gears is permitted a planetary movement about another pair of gears, and Fig. 10 is an enlarged perspective view of the indicating wheel or disk.

Figure 3:
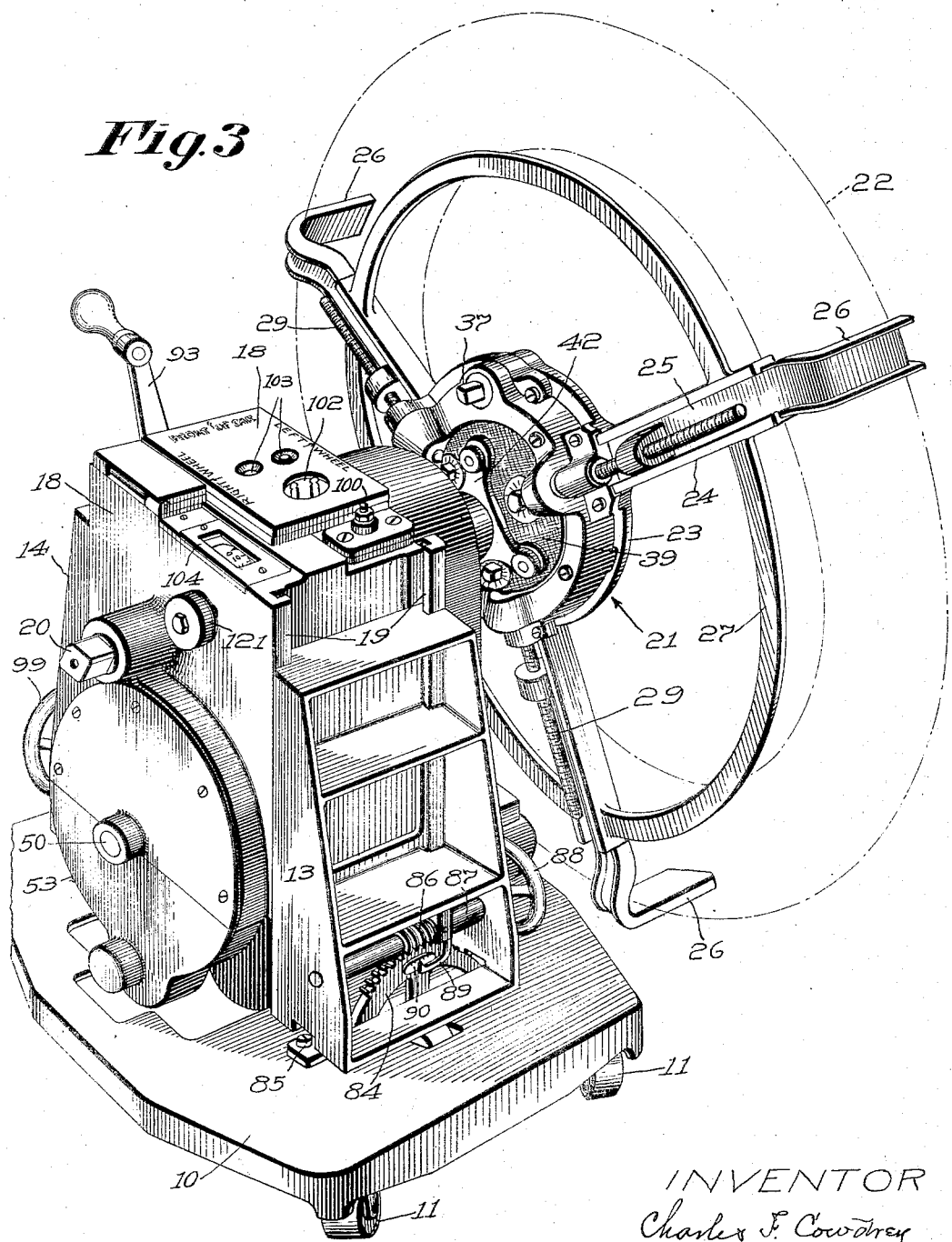
Fig. 3 is a perspective view on a larger scale of the brake testing device shown in Fig. 1.

In the embodiment of the invention illustrated, the driving mechanism for turning an automobile wheel under brake resistance is shown as mounted upon a truck 10 in order that this mechanism may be readily moved from one position to another.

The truck is provided with wheels 11 journaled in the casters 12 which are pivotally secured to the truck so that the latter may be moved freely in different directions. Upon the truck 10 are mounted the spaced columns 13 and 14, and each of these columns is pivotally secured to the truck, for a purpose to be described.

The pivotal means shown for securing the columns to the truck consists of spaced downwardly extending lugs 15 upon each column adapted to receive a horizontally extending shaft 16 which may be journaled in the lugs 17 formed upon or secured to the truck 10 the arrangement being such that the pair of columns may be tilted in one direction or the other upon the truck 10.

Between the spaced columns 13 and 14 is slidably mounted a casing 18 which is supported by the columns and may be adjusted vertically thereupon. The connection between the casing 18 and each column may conveniently take the form of a dove-tailed construction, consisting of the spaced guides 19 upon the casing and which slide in vertically disposed slots upon the columns. This construction is desirable because it prevents the columns being forced outwardly away from each other and holds them in proper alinement. Within the casing 18 is rotatively mounted the main driving shaft 20 adapted to drive the wheel engaging head 21, which head may be readily clamped to an automobile wheel 22 to rotate the same.

The head 21 may be variously constructed and as shown consists of a central casting or frame 23 having outwardly extending portions 24, three being shown in the present case. Within each portion 24 is slidably mounted a radially extending arm 25 which may be adjusted within the portion 24 towards and from the central axis of the head. At the outer end of each arm 25 is provided a tire engaging portion 26 adapted to engage the tread of the tire. The outwardly extending portions are connected by a strengthening ring 27.

It is desirable to provide means for adjusting the arms 25 simultaneously to and from the tire engaging position. In the present case this is accomplished by providing each arm 25 with a laterally extending lug 28 having a threaded bore to receive the threaded portion of a shaft 29. Each of these shafts has a bevel pinion 30 keyed or otherwise secured to its inner end, and these pinions are each rotatably supported by a lug 31 formed upon the main casting or frame 23 of the wheel engaging head. Each of the pinions 30 meshes with and is rotated by the bevel ring gear 33 which is rotatably supported by an annular flange 34 extending inwardly from the gear cover 35. The ring gear 33 has gear teeth formed about its outer periphery to engage the operating pinion 36 supported by the stub shaft 37, and a projecting end of the stub shaft is squared so that it may be manually rotated by means of a crank handle. The arrangement is such that when the pinion 36 is rotated it rotates the ring gear 33 to rotate the bevel gears 30 and threaded shafts to which they are secured, so that these shafts, due to their threaded engagement with the lugs 28, will slide the arms 25 along the inclined path in which they extend, and this will move the arms 25 either into or out of gripping engagement with the automobile wheel, depending in which direction the pinion 36 is rotated.

In different makes of automobiles the construction of the wheels differs materially and in some wheels the hub projects outwardly from the face of the wheel a substantial amount. It is desirable to secure the head 21 as close to the hub of the wheel as the wheel construction will permit, and since the hub of a large wheel may project outwardly from the plane of a wheel much further than the hub of a small wheel, it is desirable that when the arms 25 are adjusted outwardly to accommodate a large wheel, they support the central portion of the head a greater distance away from the face of the wheel than they do when applied to a small wheel. To this end the portions 24 of the head are inclined at an angle to the plane of the wheel, as clearly shown in Fig. 7, so that the arms 25 are adjusted along an inclined path. From this construction it will be seen that as the arms are adjusted inwardly they move the central portion of the head towards the face of the wheel, whereas when the arms are adjusted outwardly they move the central portion of the head outwardly away from the face of the wheel.

As stated, the head 21 is driven by the main driving shaft 20 and in some cases the shaft 20 may not be supported in accurate alinement with the head when the latter is being driven by the shaft. It is therefore desirable to provide a universal joint or connection between the shaft and head, and to this end, in the construction shown, the main casing 23 is provided with inwardly extending lugs 38 to which the flexible disk or disks 39, formed of woven fabric or other non-metallic material, is secured by bolts 40, and the shaft-engaging hub 41 has a central bore which is squared to receive the squared end of the shaft 20, and is provided with outwardly extending lugs 42 which are secured to the disks 39 by bolts 43. The arrangement is such that while the flexible disks 39 form a firm driving connection between the hub 41 and frame 23 of the head, a limited amount of angular movement is permitted between these elements, and as a result the head will be rotated smoothly by the driving shaft 20, without requiring that the shaft 20 be accurately alined with the axis of the head 21.

The brake testing device of the present invention as stated serves to rotate a wheel under brake resistance and also to indicate the turning force applied to an automobile wheel. It is desirable that the driving shaft 20 be driven by power and, in the present case, this is furnished by an electric motor 44, the casing of which has oppositely extending flanges 45 which are bolted or otherwise secured to the under face of the platform 46 provided near the bottom of the adjustable casing 18. The driving shaft 47 of the motor 44 is provided with a pinion 48 which meshes with and drives the gear 49 secured to the shaft 50. The inner end of this shaft is journaled in a bracket 51 which may be formed as an integral portion of the casing 18, and the outer end of the shaft 50 is journaled in a bearing 52 formed in a wall 53 of the casing 18. A pinion 54 is rigidly secured to the shaft 50 and this pinion meshes with and drives a large gear 55 keyed or otherwise secured to the shaft 56 which shaft is journaled at one end in the bracket 57 and at its other end in a bearing 58 of the casing wall 59.

In the present construction, yielding means is provided between the driving motor 44 and the main driving shaft 20, which serves to operate an indicator in response to the variation in the turning force applied to the shaft 20. This means may be given various forms, but in the present construction consists of a pair of gears in the chain of operating gears which are supported to move in a planetary manner about the axis of another pair of gears as the load varies. This yielding movement is resisted by a spring so that the amount of planetary movement imparted to such gears will vary with the variation in the force exerted to turn an automobile wheel under brake resistance. In the construction shown, the shaft 56 is rotatably mounted in a sleeve 60 which may be non-rotatably secured within the supporting bracket 57. Upon the sleeve 60 is rotatably mounted an arm 61 and near the outer end of this arm is mounted a short shaft 62. The opposite end of the shaft 62 is supported by a second arm 63 which is rotatably mounted upon a long sleeve 64 which may be formed integral with the pinion 65. The shaft 56 is provided with a pinion 66 which is keyed or otherwise secured thereto, and this pinion meshes with and drives a gear 67 which is rotatably supported by the shaft 62. A pinion 68 is also mounted upon the shaft 62 and this pinion is formed integral with, or is rigidly secured to the gear 67, and a brass bushing or the like 69 may be provided between the shaft 62 and the gears mounted thereupon. From the construction just described, it will be seen that the shaft 62 and the gears carried by this shaft are supported so that they may move in a planetary manner about the shaft 56 as an axis, and that this planetary movement is resisted by spring means which will now be described.

The rocking arm 63 has a portion 70 formed as a segment of a gear and this segment meshes with the gear 71 which is rotatably supported by the shaft 72. The gear 71 meshes with a rack 73 which is supported by the casing 18 to slide in a vertical direction. The lower end of the rack 73 rests upon coiled springs 74, one of which is mounted inside of the others within a pocket 75 formed in the casing 18. The use of two springs 74 is desirable as they will tend to exert a more dependable pressure than a single spring. The construction is such that the rack 73 is continuously urged upwardly by the springs 74 and this tends to rotate the gear 71 in a clockwise direction so that this gear will rotate the gear segments 70 in a contra-clockwise direction. The pinion 68 mounted upon the floating shaft 62 meshes with and drives a gear 76 which rotates about the axis of the shaft 56 and is rigidly secured to the sleeve 64, above-mentioned, as formed integral with the gear 65. A brass sleeve or the like 77 may be provided between the shaft 56 and the long sleeve 64, and the gear 65 meshes with and turns a large gear 78 which is keyed or otherwise secured to the main driving shaft 20.

From the above description of the operating gears, it will be seen that energy is imparted from the driving motor 44 to the main shaft 20 thru a number of reducing gears and that the two gears upon the shaft 62 are mounted for planetary movement about the shaft 56 as the driving force increases, but that this planetary movement is resisted by the springs 74. The movement of the segmental gear 70 is utilized to operate an indicator which indicates the turning force applied to an automobile wheel, and to this end the shaft 72 above mentioned is relatively long and is provided near its right hand end, viewing Fig. 5, with a second gear 79 which meshes with and turns a pinion 80 mounted on the shaft 81. Upon the shaft 81 is also mounted the indicating wheel or disk 82, which is best shown in Fig. 10. This disk may be secured in the desired position of angular adjustment upon its shaft 81 by a set screw 83. The screw 83 extends radially of the disk 82 so that a screw-driver inserted thru the sight opening to be described may be readily engaged with the screw to turn it so that the disk 82 may be easily turned to the zero or other position upon the shaft 81, and then clamped in this position to rotate with the shaft. As stated the driving mechanism of the present invention is mounted upon a portable truck 10, so that the testing device may be readily placed alongside any wheel of the automobile to be tested, and may be easily moved from one side of the automobile to another. In the present construction, each end of the main shaft 20 projects outwardly from the casing 18 and each end of the shaft is squared as shown so that either end may be inserted in the hub 41 of the wheel engaging head to drive the head. This construction is desirable because it permits the shaft 20 to be driven in the same direction in testing brakes upon either side of an automobile. When the head 21 is secured to an automobile wheel at the right-hand side of the automobile, one end of the shaft 20 is placed in driving engagement with the hub 41, and when the head is secured to a wheel at the left-hand side of the automobile, the opposite end of the shaft 20 is inserted in the hub 41, to drive the head. This construction avoids the necessity of reversing the direction of rotation of the shaft 20 in testing wheels on opposite sides of an automobile. However, if two testing machines are provided, one for a wheel upon one side of an automobile, and the other for the wheel upon the opposite side of the automobile, it will be necessary to construct only one end of each main shaft 20 for operative engagement with a head 21.

It is well known that the front wheels of an automobile do not rotate in a vertical plane, as they incline inwardly somewhat as they extend downwardly, to cause the automobile to steer more readily, and as a result the front axles of an automobile do not lie in a horizontal plane, but are inclined slightly to this plane. It therefore follows that in order that the shaft 20 may be placed in axial alignment with the front axle of an automobile wheel, it should be inclined slightly to the horizontal. The upright columns 13 and 14 are, therefore, pivotally secured to the truck 10, as above pointed out. In order that the shaft 20 may be readily tilted in one direction or the other to the desired inclination, the truck 10 is provided with an arcuate bracket 84 which may be rigidly secured to the upper face of the truck by bolts 85, and the upper curved face of this bracket is provided with worm teeth with which the worm 86 cooperates. The worm 86 is keyed or otherwise secured to the transversely extending shaft 87, the ends of which are journaled in the spaced side portions of the column 13. The shaft 87 and worm thereupon may be rotated by a hand wheel 88 to swing the columns in one direction or another about their pivotal axles 16. A pointer 89 secured to the column 13 is positioned to cooperate with graduations 90 upon the bracket 84 and this pointer serves to indicate when the column 13 has been adjusted to the desired position. It is found unnecessary to provide similar adjusting means on the column 14 because the engagement of the casing 18 with the columns 13 and 14 will serve to impart the adjustment of one column to the other.

Since the axles of large automobile wheels are supported a greater distance from the ground than the axles of small automobile wheels, provision should be made for raising and lowering the shaft 20 to align the same with the axles of the different automobile wheels, the brakes of which are to be tested. The casing 18 is therefore slidably secured to the columns 13 and 14, as above stated, and the casing may be raised and lowered by means of the threaded shaft 91 (see Fig. 4), which is supported by the column 14 and has threaded engagement with a lug 92 rigidly secured to a side wall of the casing 18, and the shaft 91 may be rotated in the desired direction by applying a crank handle 93 to the stub shaft 94 and rotative movement is imparted from the shaft 94 to the shaft 91 by the bevel gears 95, enclosed in a casing.

It may be desirable to rotate the main shaft 20 thru a slight angle to cause its squared ends to enter the similarly shaped hole in the hub 41 of the head 21, and to this end a transversely extending shaft 96 is provided which is rotatably supported by the casing 18 and the inner end of this shaft is provided with a bevel gear 97 which meshes with a bevel gear 98 rigidly secured to the shaft 50 (see Fig. 5). The outer end of the transversely extending shaft 96 is provided with a hand wheel 99 so that the shaft 96 may be rotated to turn the series of gears shown in Fig. 5 and rotate the shaft 20 thru a sufficient angle to permit its squared end to be easily inserted in the hub 41.

Since the rack 73 shown in Fig. 3 is urged upwardly by the coiled springs 74, it is desirable to provide adjustable means for limiting the upward movement of this rack, and a threaded bolt 100 is therefore provided which extends downwardly thru the head of the casing 18 into abutting engagement with the upper end of the rack 73, and this bolt may be adjusted to the desired position and then clamped in this position by tightening the lock nut 101. Adjustment of the bolt 100 serves to vary the reading of the indicator 82 to vary the angle thru which this indicator wheel will be rotated by a given rotating force. The top of the casing 18 is preferably marked as shown in Fig. 3, "Left wheel," "Right wheel" and "Front of car," with the arrows shown to indicate which end of the shaft 20 is to be placed in driving engagement with the head 21 when the brake testing device is used upon different sides of the automobile. The top of the casing 18 is also preferably provided with the socket 102, adapted to receive an attachment plug for supplying current to the motor 44 of the brake testing device, and the push buttons 103 are provided to start and stop the electric motor. The indicator wheel 82 is mounted within the casing 18 below the window 104, so that the reading of the wheel may be readily observed thru this window. In testing the brakes upon the opposite sides of an automobile, the foot brake pedal 105 should be depressed and maintained in the same depressed position thruout the testing operation. Various means may be provided for holding the pedal 105 in the desired depressed position and one good practical means to this end is shown in Fig. 2, and consists of a hollow column 106 in which the post 107 is slidably mounted, and, in order that the length of the pedal depressor may be varied, the post 107 is provided with a number of notches 108 adapted to receive the locking pin 109 which is normally held in the notch engaging position by a spring 110 confined between a shoulder 111 upon the hollow column and the head 112. When it is desired to adjust the post 107 telescopically within the column 106 pressure may be exerted upon the head 112 to move the pin 109 out of engagement with the notch 108, whereupon the post 107 may be moved in the direction of its length to the desired position, and then clamped in this position by the pin 109. The lower end of the column 106 is preferably provided with rubber cushions 113 or other flexible means which will prevent the portion of the automobile against which the same rests from being scratched or marred. A threaded shaft 114 extends lengthwise of the post 107 and has threaded engagement with the opposite ends of this post, and this threaded shaft may be rotated by means of the hand wheel 115 to adjust the threaded shaft lengthwise of the post 107. A pedal engaging head 116 is rotatably secured to the upper end of the threaded shaft 114, and this head has a notch or depression 117 adapted to engage an edge of the pedal 105.

When the pedal depressor of Fig. 2 is being used, the end of the same which is provided with cushions 113 rests against the upright portion 118 of the driver's seat at the point where this upright portion meets the floor 119 of the automobile, and the notched head 116 engages the foot pedal, as clearly shown in Fig. 1. The hand wheel 115 is then rotated to adjust the threaded bolt 114 lengthwise of the post 107 to exert the desired pressure upon the foot brake pedal. In this manner the foot brake pedal is held depressed the desired amount thruout the operation of testing the brakes upon the wheels at the opposite sides of the automobile, and the length of the pedal depressor may be easily adjusted to hold the pedal of any type of automobile depressed the desired amount.

The automobile wheel to be tested should be supported out of engagement with the ground during the testing operation, and the automobile is shown in Fig. 1 as having a jack 120 of well known construction placed under the differential casing of the rear axle to hold both wheels of the automobile out of engagement with the ground. The head 21 is then applied to the particular wheel which is to be tested, and the stub shaft 37 is rotated to move the arms 25 simultaneously into the tire-gripping position. The truck 10, with the driving mechanism mounted thereupon is then moved in front of the wheel to be tested and the squared end of the shaft 20 is inserted in the opening within the hub 41. The electric motor may then be started to turn the shaft 20 and head 21 to rotate the automobile wheel under brake resistance, and the turning force which is exerted upon the wheel at each instance during its rotation may be noted by observing the graduated wheel 82 thru the window 104.

In many cases it will be found that the reading of the indicator 82 will vary considerably during the complete rotation of the automobile wheel, due to defective brake lining, or to the fact that the brake drum may not be properly centered with respect to the axis of the wheel. If this variation of the action of the brake band upon its wheel during a complete revolution should be very great, some difficulty may be experienced in reading the graduations upon the disk 82, due to its rocking movement produced by the varying turning force, and in this case it may be desirable to grasp with the hand the knob 121 secured to the shaft 81 to steady or retard the rocking movement of this shaft.

What is claimed is:—

1. A brake tester for testing the action of a brake upon a wheel of an automobile, comprising in combination, a head engageable with a wheel of an automobile to rotate it under brake resistance and provided with a hub constructed to be driven by a shaft, a supporting frame, a rotating shaft upon the frame and each end of which is constructed to be placed in driving engagement with said hub, means for rotating said shaft, and means for indicating the turning force applied to said head.

2. A brake tester for testing the action of a brake upon a wheel of an automobile, comprising in combination, a supporting frame provided with a rotating shaft, means for driving said shaft, means for placing either end of the shaft in driving engagement with an automobile wheel to turn the wheel under brake resistance, and means for indicating the turning force applied to the wheel.

3. A brake tester for testing the action of the brakes upon the wheels of an automobile, comprising in combination, a supporting frame provided with a rotating shaft, means for driving said shaft, means for placing one end of the shaft in driving engagement with a wheel upon one side of an automobile and for placing the other end of said shaft in driving engagement with a wheel upon the opposite side of the automobile, and means for indicating the turning force applied to each wheel.

4. A brake tester for testing the action of the brakes upon the wheels of an automobile, comprising in combination, a head engageable with the wheels of an automobile, a supporting frame, a rotating shaft upon the frame and having one end adapted to be placed in driving engagement with the head when the latter engages a wheel upon one side of an automobile and having its opposite end adapted to be placed in driving engagement with the head when the latter engages a wheel upon the opposite side of an automobile, means for rotating said shaft, and means for indicating the turning force applied to each wheel.

5. A brake tester for testing the action of the brakes upon the wheels of an automobile, comprising in combination, a supporting frame, a shaft upon said frame and adapted to be supported with either of its ends adjacent the hub of an automobile wheel, means for driving said shaft, means for rotating an automobile wheel from either end of said shaft, and means for indicating the turning force exerted by said shaft.

6. A brake tester for testing the action of the brakes upon the wheels of an automobile, comprising in combination, a supporting frame, a shaft mounted upon the frame and having its ends projecting from the opposite sides thereof, means for rotating said shaft, a head engageable with a wheel of an automobile to rotate the same, means for driving the head from either end of said shaft, and means for indicating the rotative force applied to the automobile wheel.

7. A brake tester for testing the action of the brakes upon the wheels of an automobile, comprising in combination, a supporting frame, a shaft mounted upon the frame, means for rotating said shaft, a portable truck upon which the frame is mounted, wheel engaging means for placing either end of said shaft in driving engagement with an automobile wheel, and means for indicating the turning force applied to a wheel.

8. A brake tester for testing the action of a brake upon a wheel of an automobile, comprising in combination, a supporting frame, a shaft upon the frame, means for rotating said shaft, a head engageable with an automobile wheel to rotate it under brake resistance, a universal joint connection for driving the head from said shaft, and means for indicating the turning force applied to the wheel.

9. A brake tester for testing the action of a brake upon a wheel of an automobile, comprising in combination, a head engageable with a wheel of an automobile to rotate it under brake resistance, a hub, a universal joint forming a driving connection between the hub and head, a shaft engageable with said hub to rotate the wheel, means for rotating the shaft, and means for indicating the turning force applied to the wheel.

10. A brake tester for testing the action of a brake upon a wheel of an automobile, comprising in combination, a head engageable with a wheel of an automobile to rotate the wheel under brake resistance and having a central flange portion, a hub constructed to receive an end of a driving shaft, a nonmetallic annulus forming a universal joint for securing the hub to said central flange portion, a driving shaft engageable with said hub to rotate the head, means for rotating said shaft, and means for indicating the turning force applied to the wheel.

11. A brake tester for testing the action of a brake upon a wheel of an automobile, comprising in combination, a head engageable with a wheel of an automobile to rotate it under brake resistance, consisting of a central casing that lies in front of the automobile wheel hub, portions extending outwardly from the casing toward the automobile tire at an angle to the plane of the automobile wheel, arms secured to said portions to slide in the direction in which the portions are inclined and having tire engaging elements at their outer ends, means for rotating said head, and means for indicating the turning force exerted upon the automobile wheel.

12. A brake tester for testing the action of a brake upon a wheel of an automobile, comprising in combination, a head engageable with a wheel of an automobile to rotate it under brake resistance and having tire engaging arms supported for adjustment toward the wheel hub at an inclination to the plane of the wheel, means for rotating said head, and means for indicating the turning force applied to the wheel.

13. A brake tester for testing the action of a brake upon a wheel of an automobile, comprising in combination, a rotating shaft, means for supporting the shaft for angular adjustment about a transverse axis, means for rotating said shaft, means for operatively connecting the shaft to an automobile wheel to rotate the wheel, and means for indicating the rotative force applied to the wheel.

14. A brake tester for testing the action of a brake upon a wheel of an automobile, comprising in combination, a rotating shaft, a supporting frame for the shaft and mounted for movement about an axis transverse to the shaft to position the shaft for operative connection with an automobile wheel, means for rotating said shaft, means for connecting the shaft to an automobile wheel to turn it, and means for indicating the turning force applied to the wheel.

15. A brake tester for testing the action of a brake upon a wheel of an automobile, comprising in combination, a rotating shaft, a supporting frame for the shaft, a portable truck for said frame, means for securing the frame to the truck for tilting movement to different inclinations, means for rotating the shaft, means for connecting the shaft to an automobile wheel to rotate it, and means for indicating the rotative force applied to the wheel.

16. A brake tester for testing the action of a brake upon a wheel of an automobile, comprising in combination, a rotating shaft having a supporting frame, driving means for said shaft, means for imparting the rotative movement of the shaft to a wheel of an automobile, and means for indicating the turning force applied to the wheel, including a series of gears operated by said driving means, one of said gears being supported to move bodily in an arc about another gear, spring means for resisting the arcuate movement of said gear, an indicator, and means for imparting the yielding arcuate movement of said gear to the indicator to actuate it.

17. A brake tester for testing the action of a brake upon a wheel of an automobile, comprising in combination, a rotating shaft having a supporting frame, driving means for said shaft, means for imparting the rotative movement of the shaft to a wheel of an automobile, and means for indicating the turning force applied to the wheel, including a series of gears operated by said driving means and one of which is mounted to yield as the load increases, an indicator, and means for imparting the yielding movement of said gear to the indicator to actuate it.

18. A brake tester for testing the action of a brake upon a wheel of an automobile, comprising in combination, a rotating shaft having a supporting frame, driving means for said shaft, means for imparting the rotative movement of the shaft to a wheel of an automobile, and means for indicating the turning force applied to said shaft, including a series of gears operated by the driving means and one of which is mounted upon a floating shaft movable to different positions under different loads, an indicator, and means for imparting the movement of the floating shaft to the indicator to actuate it.

19. A brake tester for testing the action of a brake upon a wheel of an automobile, comprising in combination, a rotating shaft, a supporting frame for the shaft, means for driving the shaft, means for imparting the rotative movement of the shaft to a wheel of an automobile, a spring mounted in a fixed position upon said frame, means for transmitting power from said driving means to the shaft and operable to tension the spring as the load increases, an indicator, and means operable in response to the yielding movement of the spring to actuate the indicator so that it will indicate the turning force applied to the wheel.

20. A brake tester for testing the action of a brake upon a wheel of an automobile, comprising in combination, a rotating shaft having a supporting frame, means for driving said shaft, means for imparting the rotative movement of the shaft to a wheel of an automobile, a series of gears operated by the driving means to drive the shaft, a bracket forming a support for one of said gears and mounted for rocking movement about the axis of another of the gears as the load varies, a spring for resisting the rocking movement of said bracket, an indicator, and means for imparting the rocking movement of the brackets to the indicator to actuate it.

21. A brake tester for testing the action of a brake upon a wheel of an automobile, comprising in combination, a rotating shaft having a supporting frame, means for driving said shaft, means for imparting the rotative movement of the shaft to a wheel of an automobile, a series of gears operated by the driving means to drive the shaft, a bracket forming a support for one of said gears and mounted for rocking movement about the axis of another of the gears as the load varies, a spring actuated rack for urging the bracket in one direction and adapted to yield as the driving force applied to said shaft increases, an indicator, and means for imparting the rocking movement of the bracket to the indicator.

22. A brake tester for testing the action of a brake upon a wheel of an automobile, comprising in combination, a rotating shaft having a supporting frame, a driving motor for said shaft, means for imparting the rotative movement of the shaft to an automobile wheel, a series of gears between said motor and shaft and one of which is mounted for movement bodily about another gear as the load increases, an indicator, and means for imparting the movement of the bodily movable gear to the indicator to actuate it.

23. A brake tester for testing the action of a brake upon a wheel of an automobile, comprising in combination, a rotating shaft having a supporting frame, driving means for said shaft, means for imparting the rotative movement of the shaft to an automobile wheel, a series of reducing gears between the driving means and shaft and one of which is mounted for movement bodily about another of said gears as the load increases, an indicator, and means actuated by said bodily movement for operating the indicator to indicate the force applied to the shaft.

24. A brake tester for testing the action of a brake upon a wheel of an automobile comprising, in combination, a rotating shaft having a supporting frame, a base upon which the frame is adjustably mounted, means for securing the frame in different positions of angular adjustment upon the base to position the shaft for operative connection with an automobile wheel, means for rotating said shaft, and means for indicating the turning force applied to the shaft.

25. A brake tester for testing the action of a brake upon a wheel of an automobile comprising, in combination, a rotating shaft having a supporting frame, a base upon which the frame is adjustably mounted, means for adjusting the frame to different positions upon the base, means for rotating said shaft, and means for indicating the turning force applied to the shaft.

26. A brake tester for testing the action of a brake upon a wheel of an automobile, comprising in combination, a shaft having a supporting frame, means for rotating said shaft, means for imparting the rotative movement of the shaft to a wheel of an automobile, yielding means that is subjected to the turning force applied to the automobile wheel, a graduated wheel for indicating the turning force applied to the automobile wheel, and mechanism actuated by said yielding means to rotate the graduated wheel.

27. A brake tester for testing separately the action of the brakes upon the wheels of an automobile that the brake action upon the wheels may be measured and equalized, comprising, in combination, power means for imparting a continuous rotative movement to one of the wheels of an automobile to turn the wheel thru a complete rotation under brake resistance, and indicator means interposed between the source of power and the automobile wheel whose brake is being tested for indicating the force necessary to turn that wheel thruout a complete rotation while under brake resistance.

28. A brake tester for testing separately the action of the brakes upon the wheels of an automobile, that the brake action upon the wheels may be equalized, comprising, in combination, power driven means and connections therefrom to one of the wheels of an automobile to rotate that wheel thru a complete revolution under brake resistance, and indicator means interposed between the source of power and the automobile wheel whose brake is being tested to indicate the force exerted upon the wheel thruout its complete rotation.

29. A brake tester for testing the action of a brake upon a wheel of an automobile, comprising in combination, a motor, means operated by the motor and adapted to be placed in driving connection with any one of the four wheels of an automobile to rotate the wheel under brake resistance, and an indicator operable by the driving torque and adapted to indicate the force exerted to maintain the wheel in rotation.

30. A brake tester for testing the action of a brake upon a wheel of an automobile, comprising in combination, a supporting frame, an element rotatably supported by the frame, means for rotating said element, means engageable with a wheel of an automobile and rotatable by said element to turn the wheel under brake resistance, and an indicator for indicating the force exerted to maintain the wheel in rotation.

31. A brake tester for testing the action of a brake upon a wheel of an automobile, comprising in combination, a column, a rotating element supported by the column with its axis of rotation aligned with the axis of a wheel of the automobile, means for rotating said element, means engageable with said wheel and rotatable by said element to turn the wheel under brake resistance, and an indicator for indicating the force exerted to maintain the wheel in rotation.

32. A brake tester for testing the action of a brake upon a wheel of an automobile, comprising in combination, a column, a rotating element supported by the column, means for raising and lowering said element to bring its axis of rotation in alignment with the axis of a wheel of the automobile, means for rotating said element, means engageable with said wheel and rotatable by said element to turn the wheel under brake resistance, and an indicator for indicating the force exerted to maintain the wheel in rotation.

33. A brake tester for testing the action of a brake upon a wheel of an automobile comprising in combination, a tire gripping device constructed to be secured to an automobile wheel, tire engaging elements upon said device, means for moving said elements simultaneously into the tire gripping position, a supporting frame, means upon the frame for driving the tire gripping device to rotate a wheel under brake resistance, and an indicator for indicating the force required to keep the wheel rotating under brake resistance.

34. A brake tester for testing the action of a brake upon a wheel of an automobile, comprising in combination, a head having laterally extending arm portions engageable with a wheel of an automobile to turn the wheel through successive revolutions under brake resistance, means for rotating said head to turn the wheel, and means for indicating the turning force exerted upon the wheel.

35. A brake tester for testing the action of a brake upon a wheel of an automobile, comprising in combination, a head having arms engageable with the tread of the wheel to secure the head to the wheel concentric with the wheel axis, means for rotating the head to turn the wheel under brake resistance, and means for indicating the turning force applied to the wheel.

36. A brake tester for testing the action of a brake upon a wheel of an automobile comprising in combination, a portable frame, a shaft rotatably supported by said frame, a motor for driving said shaft, means for imparting the rotative movement of said shaft to the wheel of an automobile to turn the wheel under brake resistance, and means for indicating the turning force applied to the wheel.

37. A brake tester for testing the action of the brakes upon the wheels of an automobile, comprising in combination, a stand, a tire gripping device consisting of a hub portion having arms extending therefrom and adapted to be moved toward each other into gripping engagement with the tire, means mounted upon the stand and adapted to rotate said device to turn a wheel under brake resistance, and means for indicating the turning force applied to the wheel.

38. A brake tester for testing the action of the brakes upon the wheels of an automobile, comprising in combination, a stand, a tire gripping device consisting of a hub portion having arms extending therefrom, means for moving the arms simultaneously into gripping engagement with the tire, means mounted upon the stand and adapted to rotate said device to turn a wheel under brake resistance, and means for indicating the turning force applied to the wheel.

39. A brake tester for testing the action of the brakes upon the wheels of an automobile, comprising in combination, a supporting frame, a motor, a wheel engaging device for turning an automobile wheel, a series of elements for transmitting power from the motor to the wheel engaging device including a yielding connection, and an indicator under the control of the yielding connection and adapted to indicate the turning force applied to the wheel.

40. A brake tester for testing the action of the brakes upon the wheels of an automobile, comprising in combination, a supporting frame, a wheel engaging device for turning an automobile wheel, rotating elements mounted upon said frame and one of which is in driving engagement with the wheel engaging device, a yielding driving connection between said elements for driving one element from the other, and an indicator operated by the yielding movement of the driving connection to indicate the turning force required to rotate the wheel under brake resistance.

41. A device for testing the action of the brakes upon the wheels of an automobile, comprising in combination, a stand, a driving shaft supported by said stand, wheel engaging means adapted to be secured to an automobile wheel and driven by said shaft, means for rotating said shaft, means for raising and lowering said shaft, and an indicator for indicating the force applied to the wheel to rotate it under brake resistance.

42. A device for testing the action of the brakes upon the wheels of an automobile, comprising in combination, a stand, a casing mounted upon said stand for an up and down movement, a driving shaft supported by said casing, means for rotating said shaft, wheel engaging means adapted to be driven by said shaft to rotate an automobile wheel under brake resistance, means for raising and lowering said casing to bring the shaft into alignment with the axis of the automobile wheel, and indicating means for indicating the force applied to the wheel to turn it under brake resistance.

43. A brake tester for testing the action of a brake upon a wheel of an automobile comprising in combination, a head engageable with a wheel of an automobile to turn the wheel under brake resistance, a driving shaft for rotating the head, means for driving the shaft, and means interposed between the source of power and automobile wheel for indicating the turning force exerted upon the wheel.

44. A brake tester for testing the action of a brake upon a wheel of an automobile, comprising in combination, a head engageable with a wheel of an automobile to turn the wheel continuously through a complete revolution under brake resistance, means for rotating said head to turn the wheel, and means interposed between the source of power and automobile wheel for indicating the turning force exerted upon the wheel.

45. A brake tester for testing separately the action of the brakes upon the wheels of an automobile that the brake action upon the wheels may be equalized, comprising, in combination, a motor, means operable by the motor for rotating one of the wheels of an automobile continuously thru a complete rotation while under brake resistance, yielding means between the wheel and source of power adapted to yield in proportion to the driving force required to turn the wheel against the brake resistance, and indicator means to indicate such required force that upon completion of the brake test separately on two or more wheels the action of the brakes on the wheels may be equalized.

46. A brake tester for testing separately the action of the brakes upon the wheels of an automobile that the brake action upon the wheels may be measured and equalized, comprising, in combination, power means for imparting a continuous rotative movement to one of the wheels of an automobile to turn the wheel thru a complete rotation under brake resistance, a truck on which the power means for turning the wheel is mounted, and indicator means interposed between the source of power and the automobile wheel whose brake is being tested for indicating the force necessary to turn that wheel thruout a complete rotation while under brake resistance.

47. A brake tester for testing separately the action of the brakes upon the wheels of an automobile that the brake action upon the wheels may be measured and equalized, comprising, in combination, means independent of the automobile driving mechanism for rotating a wheel continuously thru a complete revolution under brake resistance, and means interposed between the automobile wheel and source of power for indicating the force required to maintain the rotative movement of the particular wheel being tested under the brake resistance acting upon that wheel.

48. A brake tester for testing separately the action of the brakes upon the wheels of an automobile that the brake action upon the wheels may be measured and equalized, comprising, in combination, motor driving means for rotating a wheel of an automobile continuously under brake resistance, thru a complete revolution that the brake action at all points in the revolution of the wheel may be tested, and means operable by the wheel turning torque to indicate the turning force exerted upon the wheel thruout the entire rotation of the wheel.

49. A brake tester for testing the action of a brake upon a wheel of an automobile, comprising in combination, a stand, a driving shaft supported by the stand in axial alignment with the axis of an automobile wheel, means for rotating said shaft, means for imparting the rotative movement of the shaft to said wheel to turn the wheel under brake resistance, and means for indicating the turning force exerted upon the wheel.

50. A brake tester for testing the action of a brake upon a wheel of an automobile, comprising in combination, a stand, a driving shaft supported by the stand to turn an automobile wheel, means for rotating said shaft, means for imparting the rotative movement of the shaft to an automobile wheel to turn it under brake resistance, and means operated by the wheel turning torque to indicate the turning force exerted upon the wheel.

51. A brake tester for testing the action of a brake upon a wheel of an automobile, comprising in combination, a supporting frame, a portable truck upon which the frame is mounted, a driving shaft rotatably supported by the frame, means for rotating the shaft, means for imparting the rotative movement of the shaft to a wheel of an automobile to rotate the wheel under brake resistance, and means operable by the wheel turning torque to indicate the turning force exerted upon the wheel.

52. A brake tester for testing the action of a brake upon a wheel of an automobile, comprising in combination, a supporting frame, a driving shaft supported by said frame, means for rotating said shaft, a wheel engaging device removably secured to and driven by said shaft to rotate a wheel of an automobile under brake resistance, and means operable by the wheel turning torque to indicate the turning force exerted upon the wheel.

53. A brake tester for testing separately the action of the brakes upon the wheels of an automobile while the brakes are applied with an unvarying force upon the wheels that the brake action upon the separate wheels may be measured and equalized, comprising in combination, power means applicable to the wheels of an automobile to turn the wheels independently thru a complete revolution while under the unvarying brake force, and indicator means between the source of power and the automobile wheel the brake of which is being tested to indicate the force necessary to turn the wheel at all points of its complete rotation.

54. A brake tester for testing separately the action of the brakes upon the wheels of an automobile while the brakes are applied with an unvarying force upon the wheels that the brake action upon the separate wheels may be measured and equalized, comprising in combination power means applicable to the wheels of an automobile to turn the wheels independently thru a complete revolution while under the unvarying brake force, a motor for driving the power means, and indicator means between the source of power and the automobile wheel the brake of which is being tested to indicate the turning force applied to the wheel.

In testimony whereof, I have signed my name to this specification.

CHARLES F. COWDREY.